United States Patent
Petri et al.

(10) Patent No.: US 12,481,752 B2
(45) Date of Patent: Nov. 25, 2025

(54) METHODS AND APPARATUS FOR MANAGING TRUSTED DEVICES

(71) Applicant: Arm Limited, Cambridge (GB)

(72) Inventors: Gustavo Federico Petri, Cambridge (GB); Dominic Phillip Mulligan, Cottenham (GB); Derek Del Miller, Austin, TX (US); Hugo John Martin Vincent, Cambridge (GB)

(73) Assignee: Arm Limited, Cambridge (GB)

( * ) Notice: Subject to any disclaimer, the term of this patent is extended or adjusted under 35 U.S.C. 154(b) by 261 days.

(21) Appl. No.: 17/846,214

(22) Filed: Jun. 22, 2022

(65) Prior Publication Data

US 2023/0418930 A1 Dec. 28, 2023

(51) Int. Cl.
*G06F 21/53* (2013.01)
*G06F 21/60* (2013.01)
*H04L 9/32* (2006.01)

(52) U.S. Cl.
CPC ............ *G06F 21/53* (2013.01); *G06F 21/606* (2013.01); *H04L 9/3213* (2013.01); *G06F 2221/031* (2013.01)

(58) Field of Classification Search
CPC ....... H04W 12/69; H04W 12/55; G06F 21/53; G06F 21/606; G06F 21/57; G06F 2221/031; H04L 9/3213
See application file for complete search history.

(56) References Cited

U.S. PATENT DOCUMENTS

| | | | |
|---|---|---|---|
| 9,560,184 B2 * | 1/2017 | Kammer | H04W 68/00 |
| 10,079,812 B1 * | 9/2018 | Thadishetty | H04L 67/06 |
| 10,103,892 B2 * | 10/2018 | Grobman | H04L 63/123 |
| 11,354,448 B2 * | 6/2022 | Yang | G06F 21/64 |
| 11,416,620 B1 * | 8/2022 | Paczkowski | G06F 21/575 |
| 11,650,800 B2 * | 5/2023 | Scarlata | G06F 21/64 |
| | | | 717/140 |
| 2010/0082984 A1 * | 4/2010 | Ellison | H04L 9/3236 |
| | | | 713/170 |

(Continued)

OTHER PUBLICATIONS

International Search Report and Written Opinion of the International Searching Authority for PCT/GB2023/051161 mailed Sep. 12, 2023, 14 pages.

(Continued)

*Primary Examiner* — Mohammad A Siddiqi
(74) *Attorney, Agent, or Firm* — NIXON & VANDERHYE P.C.

(57) ABSTRACT

Aspects of the present disclosure relate to an apparatus comprising TEE circuitry configured to maintain a list of trusted devices, and interface circuitry to provide communication between the TEE of the apparatus and TEE circuitry of a device communicatively coupled to the apparatus. The TEE circuitry of the apparatus is configured to perform, with the TEE circuitry of the device, a remote attestation in respect of the TEE circuitry of the device. Responsive to a positive outcome of the remote attestation, the device is added to the list of trusted devices. The TEE of the apparatus receives, from the TEE circuitry of the device, an indication of one or more further devices which are trusted by the device, and adds said one or more further devices to the list of trusted devices.

20 Claims, 5 Drawing Sheets

(56) References Cited

U.S. PATENT DOCUMENTS

| | | | | |
|---|---|---|---|---|
| 2010/0198032 | A1* | 8/2010 | Simpson | G01N 33/48785 455/66.1 |
| 2013/0347025 | A1* | 12/2013 | Prakash | H04N 21/25875 725/25 |
| 2014/0282978 | A1* | 9/2014 | Lerner | H04L 63/083 726/7 |
| 2015/0067838 | A1* | 3/2015 | Gunti | G06F 21/51 726/22 |
| 2015/0163229 | A1* | 6/2015 | Lindteigen | H04L 9/0618 713/155 |
| 2018/0107826 | A1* | 4/2018 | Ellis | G06F 21/53 |
| 2020/0084202 | A1* | 3/2020 | Smith | H04W 12/08 |
| 2020/0120458 | A1* | 4/2020 | Aldana | H04W 36/0088 |
| 2020/0221513 | A1* | 7/2020 | Kandler | B60C 23/0442 |
| 2020/0356085 | A1* | 11/2020 | Wentz | H04L 9/0866 |
| 2021/0117534 | A1* | 4/2021 | Maximov | G06F 21/53 |
| 2021/0288944 | A1 | 9/2021 | Petri et al. | |
| 2022/0021690 | A1* | 1/2022 | Fu | H04L 63/068 |
| 2022/0035904 | A1* | 2/2022 | Bursell | H04L 63/10 |
| 2022/0103570 | A1* | 3/2022 | Nainar | H04W 12/102 |
| 2022/0116445 | A1* | 4/2022 | Filippou | H04L 41/0853 |
| 2022/0158856 | A1* | 5/2022 | Maximov | H04L 9/3271 |
| 2022/0377078 | A1* | 11/2022 | Mukherjee | H04L 63/101 |
| 2023/0084297 | A1* | 3/2023 | Paczkowski | H04W 12/069 709/248 |
| 2023/0344649 | A1* | 10/2023 | Zamani | G06Q 20/3227 |

OTHER PUBLICATIONS

A. Visintin et al, "SAFE$^d$: Self-Attestation For Networks of Heterogenous Embedded Devices" 2018 Association for Computing Machinery, Woodstock '18, Jun. 3-5, 2018, 12 pages.

N. Asokan et al, "SEDA; Scalable Embedded Device Attestation". CCS'15, Oct. 12-16, 2015, pp. 964-975.

* cited by examiner

| DEVICE ID | TRUSTED? | ALIVE? |
|---|---|---|
| 001 | Y | Y |
| 002 | Y | N |
| 003 | Y | Y |
| - | - | - |
| - | - | - |
| - | - | - |

METHODS AND APPARATUS FOR MANAGING TRUSTED DEVICES

BACKGROUND

The present technique relates to the field of management of trusted devices, for example in large-scale peer-to-peer attested networks. In such networks, pairs of nodes (e.g. devices) may mutually establish trust such that each node establishes trust with each other node in a pairwise fashion. However, this can be computationally expensive, in particular as the size of the network increases: the number of trust establishment operations grows quadratically with the number of nodes. This is particularly notable in systems in which the trust establishment operation is relatively computationally demanding. There is therefore a desire for a more computationally efficient way of establishing such mutual trust.

SUMMARY

At least some examples provide an apparatus comprising:
trusted execution environment, TEE, circuitry, configured to maintain a list of trusted devices;
interface circuitry to provide communication between the TEE circuitry of the apparatus and TEE circuitry of a device communicatively coupled to the apparatus;
wherein the TEE circuitry of the apparatus is configured to:
  perform, with the TEE circuitry of the device, a remote attestation in respect of the TEE circuitry of the device;
  responsive to a positive outcome of the remote attestation, add the device to the list of trusted devices;
  receive, from the TEE circuitry of the device, an indication of one or more further devices which are trusted by the device; and
  add said one or more further devices to the list of trusted devices.

Further examples provide a method, performed by a device comprising TEE circuitry, comprising:
maintaining a list of trusted devices;
establishing communication with TEE circuitry of an apparatus;
performing, with the TEE circuitry of the apparatus, a remote attestation in respect of at least one of the TEE circuitry of the device and the TEE circuitry of the apparatus;
responsive to a positive outcome of the remote attestation, transmitting the list of trusted devices to the TEE circuitry of the apparatus.

Further examples provide a system comprising an apparatus as described above and a device configured to perform the method described above.

Further aspects, features and advantages of the present technique will be apparent from the following description of examples, which is to be read in conjunction with the accompanying drawings.

DESCRIPTION OF EXAMPLES

In an example there is provided an apparatus, which may for example be a node of a network within which mutual trust is to be established between nodes.

The apparatus comprises trusted execution environment, TEE, circuitry. The TEE circuitry maintains a list of trusted devices. For example, one or more of these may be devices with which the apparatus has previously established mutual trust.

The apparatus comprises interface circuitry to provide communication between the TEE circuitry of the apparatus and TEE circuitry of a device that is communicatively coupled to the apparatus. The device may for example be another device of the network, with which the apparatus has not established mutual trust.

One or both of the TEE circuitry and interface circuitry may be physical circuitry elements. Alternatively, one or both of the TEE circuitry and interface circuitry may be implemented as logical components implemented by general purpose circuitry, such as a central processing unit.

The TEE circuitry of the apparatus is configured to perform, with the TEE circuitry of the device, a remote attestation in respect of the TEE circuitry of the device. Specific examples of such attestation are described in more detail below. However, in general, the attestation provides a reliable confirmation that the TEE circuitry of the device is configured to function in an expected and trustworthy manner. A successful attestation thus allows the apparatus to trust the device. Responsive to a positive outcome of the remote attestation, the TEE circuitry of the apparatus adds to device to its list of trusted devices.

Similarly, a remote attestation process may be performed in respect of the TEE circuitry of the apparatus. Mutual trust can thus be established between the apparatus and the device.

Subsequent to the positive attestation, the TEE circuitry of the apparatus receives, from the TEE circuitry of the device, an indication of one or more further devices which are trusted by the device. For example, a trusted device list of the device may be transmitted to the apparatus.

Because the device is trusted it can be assumed that further devices, which are trusted by the device, can also be trusted. In effect, the chain of trust is extended. Consequently, the TEE circuitry of the apparatus can add said one or more further devices to its own list of trusted devices. Similarly, the TEE circuitry of the apparatus may transmit its trusted device list to the TEE circuitry of the device, for the device to add to its own trusted device list. Thus, in an example, for each trusted device in such a list, that trusted device has either previously performed a remote attestation process with the holder of the list, or was identified as a trusted device in an indication of trusted devices received from TEE circuitry of another trusted device.

The present example thus allows trust to be established between devices, without requiring direct communication between each pair of devices. This is significantly more efficient: instead of growing quadratically, the number of remote attestation processes grows linearly with the number of devices in the network. This reduces traffic in the network, as well as reducing the processing resources which are consumed in performing the remote attestation processes (which can be relatively large). This improves the robustness of the establishment of trust, for example where a network is partitioned, or one or more disconnections occurs within the network. In such examples, even if a device cannot reach an attestation service (described in more detail below), it may be able to rely on the attestation data of another device.

In general, the above-described process can be applied to further devices. For example, the TEE circuitry of the apparatus may be configured to establish a connection, via the interface circuitry, with TEE circuitry of such a further device. For example, this may be a device which is newly connected to the network. The TEE circuitry of the apparatus can then perform, with the TEE circuitry of the further device, a remote attestation process in respect of the TEE circuitry of the apparatus and/or the TEE circuitry of the device. Responsive to a positive outcome of the attestation, the TEE circuitry of the apparatus transmits its list of trusted devices to the TEE circuitry of the further device. Thus, the above-described process can be extended to further devices. In the example in which the further device is a newly-added device, this allows the further device to efficiently obtain a list of trusted devices without having to perform a mutual attestation process with every such device.

In an example, the list of trusted devices is initially empty. Thus, a newly-added (or newly-configured) device can rapidly and efficiently establish a list of trusted devices by performing one or more iterations of the above-described process with other devices. Mutual trust can thus efficiently propagate through a network.

In an example, the TEE circuitry of the apparatus is configured to receive, from TEE circuitry of one or more of the devices in the list of trusted devices, a further indication of one or more trusted devices. The devices in this further indication can then be added to the apparatus's list of trusted devices. Thus, once trust has been established between two devices, they can continue to share the details of further devices with which they establish trust. For example, such details may be shared periodically. This allows mutual trust to continue to propagate through a network, allowing a trusted network to be efficiently established and managed.

For example, a device may be configured to update its list of trusted devices, and to transmit the updated list to TEE circuitry of one or more other devices (e.g. the above-described apparatus). Updating the list may comprise identifying a device as a trusted device and adding it to the list, or identifying a device as no longer being trusted and removing it from the list. Up-to-date trust information can thus be efficiently shared.

In an example, the TEE circuitry is configured to perform the above-mentioned remote attestation responsive to establishing communication with a device. Thus trust can be established as a preliminary act, prior to further interaction with a device. This can assure that activity in the network is between devices which trust each other. For example, the TEE circuitry of the apparatus may be configured to confidential and/or authenticated communication with devices in its list of trusted devices, and to not conduct such confidential and/or authenticated communications with devices that are not in the list of trusted devices. In this manner, network security is effectively maintained.

The above-mentioned remote attestation can be performed in various ways. In an example, the TEE circuitry of the apparatus initiates the remote attestation by transmitting an attestation request to the TEE circuitry of the device. In response, the TEE circuitry of the device returns an attestation token. The token may for example contain data indicative of the functionality of the TEE of the device. The TEE circuitry of the apparatus validates the attestation token and, responsive to a positive (i.e. successful) validation, determines a positive outcome of the remote attestation.

The attestation token can include various data indicative of the functionality of the TEE of the device. For example, it may comprise one or more of: information corresponding to a firmware version of the TEE of the device, information corresponding to hardware properties of the TEE of the device, information corresponding to code to be executed by the TEE of the device, a cryptographic key for communication between the TEE of the device and the TEE of the apparatus, and/or a cryptographic hash or digest of one or more of the above.

This validation of the attestation token can be performed in various ways. For example, the TEE of the apparatus may be configured to perform the validation itself, for example with reference to cryptographic data installed during an initial configuration. Alternatively, the validation may be performed by a third party. For example, the TEE of the apparatus may transmit the validation token a trusted third party and receive from the third party, in response, a validation outcome report. The outcome report indicates whether the validation was successful. The trusted third party may be a validation service, for example provided by a manufacturer or designer of the apparatus.

In examples, the above-described propagation of trusted device lists may be performed using an epidemic protocol (such as Gossip). The epidemic protocol may be further used to transmit further metadata between the TEEs of apparatuses/devices in the network. An example of such further metadata is liveness information associated with the trusted devices. Thus, the epidemic protocol may be efficiently used for multiple purposes, including sharing trusted device lists and also sharing other metadata regarding the network.

Examples of the present disclosure will now be described with reference to the drawings.

Figure 1:
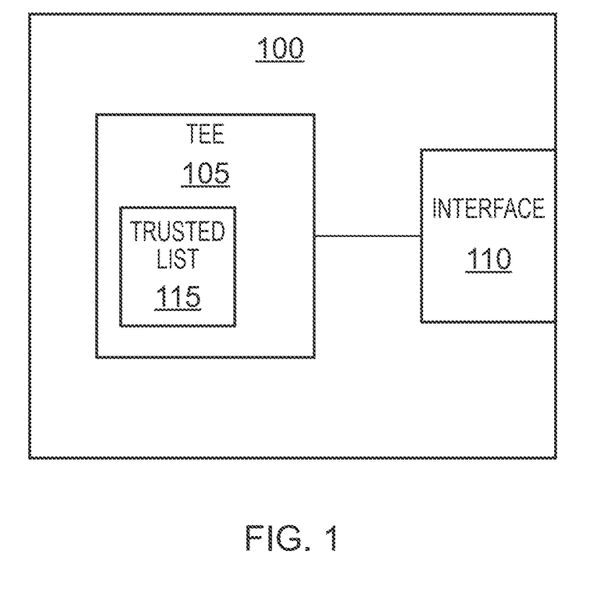
FIG. 1 schematically depicts an apparatus.

FIG. 1 schematically shows an apparatus 100 according to an example. The apparatus 100 comprises a trusted execution environment (TEE) 105. This is a processing element which has functionality that is assured: it can be trusted that the TEE 105 will behave in an expected and trustworthy manner. This functionality can be proved by way of an attestation process which is described in more detail below.

The apparatus 100 further comprises an interface 110 with which the TEE 105 (and potentially other elements of the apparatus which are not shown in FIG. 1) can interact with other apparatuses.

The TEE 105 maintains a list 115 of trusted devices. These are devices, with which the apparatus 100 is in communication and with which the TEE 105 has established trust.

Figure 2:
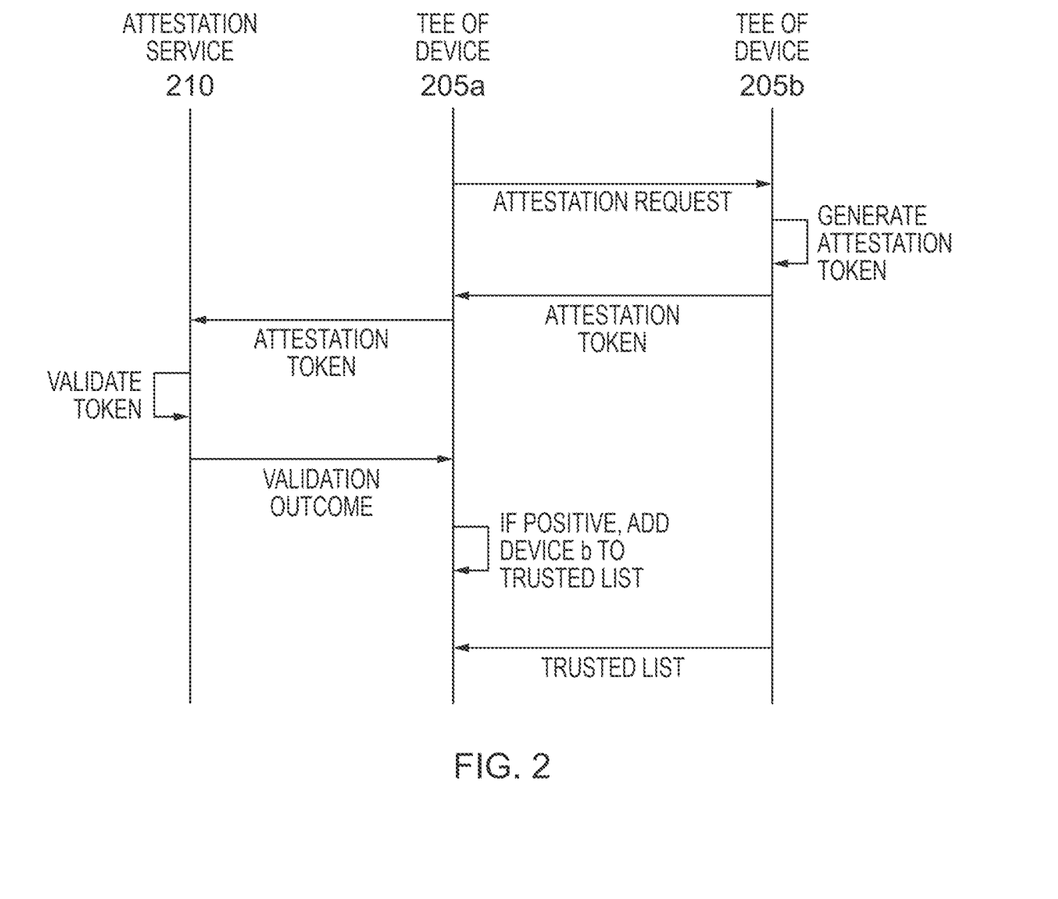
FIG. 2 depicts the establishment of trust between two devices.

FIG. 2 depicts a method by which TEEs of two devices 205a, 205b can establish trust. For simplicity, FIG. 2 shows a one-way process in which the TEE of device 205a establishes that the TEE of device 205b is trustworthy, but the process can be (e.g. simultaneously) performed in the opposite direction, such that mutual trust is established.

FIG. 2 shows communication between the TEE of device 205a, the TEE of device 205b, and an attestation service 210. The devices 205a, 205b may each be configured in the same manner as the apparatus 100 of FIG. 1, such that each maintains a list of trusted devices. The attestation service 210 is trusted by both devices 205a, 205b, and may for example be provided by a designer or manufacturer of one or both of the devices 205a, 205b.

Initially, the TEE of device 205a transmits an attestation request to the TEE of device 205b. In response, the TEE of device 205b generates an attestation token and returns it to the TEE of device 205a. The attestation token is indicative of the functionality of the TEE of device 205b, and may for example comprise a hash or digest of processing instructions which it is configured to execute. Alternatively or additionally, it may comprise data indicative of configuration data of the TEE of device 205b.

The token may further comprise a public key (or data indicative thereof) whose associated private key is known only to the TEE being attested. After the token is authenticated, the TEE of device 205a can trust that communications signed by the private key come from attested TEE of device 205b, and that any data encrypted with the public key can be decrypted only by the attested TEE of device 205b. The TEE of device 205a may be configured to subsequently pass the public key to further nodes, to allow them to communicate securely with the TEE of device 205b. The attesting TEE (node 1) can then pass that public key to any future node (node 3) that requests attestation from it (node 1), allowing that node to communicate securely with the original attested TEE (node 2).

The TEE of device 205a forwards the attestation token to the attestation service 210, which validates the token. For example, the validation may include verifying that a hash or digest within the token correctly matches an expected value, based on the correct functionality of the TEE of device 205b. The attestation service then transmits the outcome of the validation to the TEE of device 205a.

If the validation was successful, indicating that the TEE of device 205b is functioning in the expected manner and is thus trustworthy, the TEE of device 205a adds device 205b to its trusted list. Conversely, in response to a failed validation, the TEE of device 205a ceases communication with device 205b.

Once it has been established that the TEE of device 205a can trust the TEE of device 205b, it retrieves the trusted device list of device 205b. On the assumption that trust is transitive, it can be assumed that any device that is trusted by a trusted device is itself trustworthy. The TEE of device 205a can thus add the contents of device 205b's list to its own trusted device list. It can thereby establish that it can trust those devices without performing a full attestation process in respect of each such device. This can significantly reduce network traffic and processing overhead, in particular when the method is extended to networks with a larger number of devices.

Figure 3A:
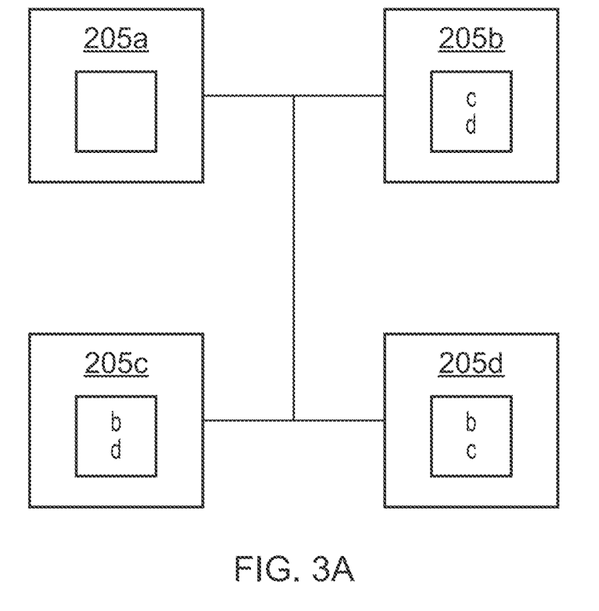
FIGS. 3A to 3C depict the establishment of trust with a network.
Figure 3B:
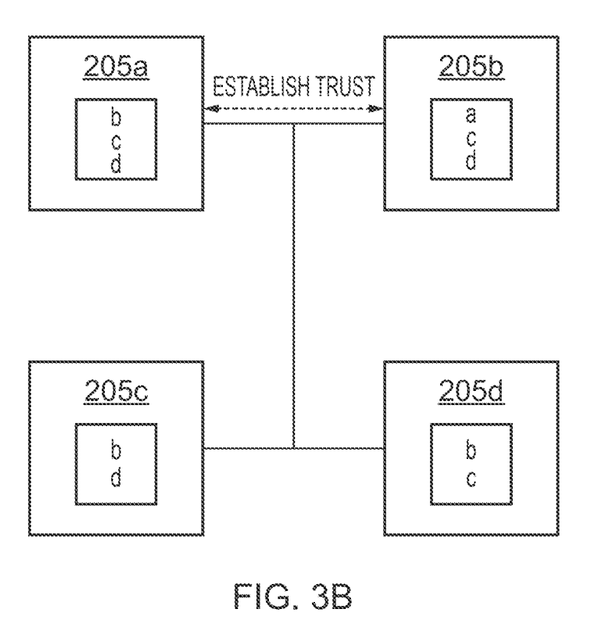
Figure 3C:
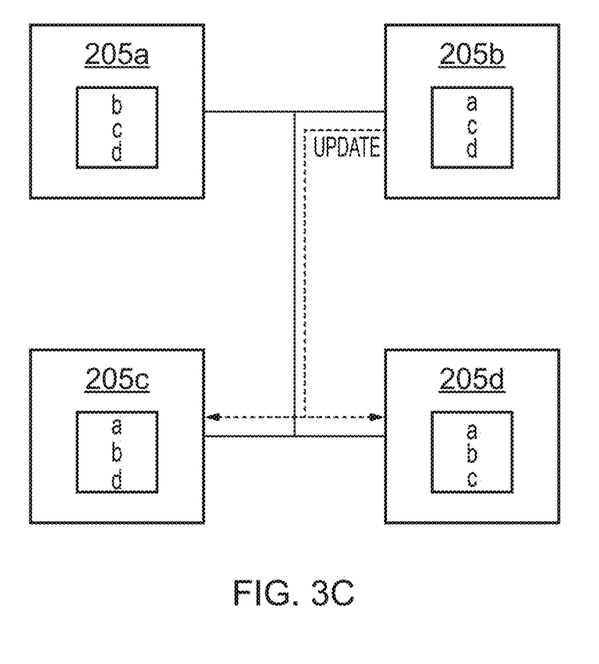

FIGS. 3A to 3C depict establishment of mutual trust in an example network comprising four devices 205a, 205b, 205c, 205d. Each device functions in the same manner as the devices 205a, 205b of FIG. 2.

In FIG. 3A, device 205a has joined the network and is thus communicatively coupled to devices 205b, 205c, 205d. However, it has not yet established trust with any other devices, and thus its trusted device list is empty. Devices 205b, 205c, 205d, on the other hand, have previously established mutual trust, such that the trusted device list of each of these devices includes the other two devices.

In FIG. 3B, trust is established between devices 205a and 205b. This is performed in the manner set out above with reference to FIG. 2, such that the TEE of device 205a attests its functionality to device 205b, and the TEE of device 205b attests its functionality to device 205a. Devices 205a and 205b thus add each other to their respective trusted device lists. When mutual trust has been established between devices 205a and 205b, device 205b shares its trusted device list with device 205a, which adds the content thereof to its own trusted device list. Thus, devices 205a and 205b each trust all of the other devices in the network. However, devices 205c and 205d have not yet established that they trust device 205a.

In FIG. 3C, device 205b updates devices 205c, 205d that it has added device 205a to its trusted device list. Because devices 205c, 205d trust device 205b, they can add device 205a to their own trusted device lists.

Thus, at the conclusion of FIG. 3C, all four devices 205a, 205b, 205c, 205d have established mutual trust, such that all devices trust all other devices. This has been achieved with a single mutual attestation between devices 205a and 205b (i.e. two attestations), and two update communications from device 205b (one to device 205c, and one to device 205d). This is significantly more efficient than a comparative example in which mutual attestation needs to be performed between device 205a and each of the other devices: in such a comparative example, four mutual attestations would be performed. This efficiency would become even more significant as more devices are added to the network.

More generally, the following example algorithm may be used to establish mutual trust within an arbitrary, unbounded collection of nodes (each of which may be one of the aforementioned devices), in order to set up a trustworthy point-to-point network. This uses an epidemic protocol (e.g. Gossip) to propagate attestation data.

Each node maintains a list of nodes that are known to have been attested and are therefore trusted by the node. Initially, these lists are empty, but will consist of the identifying information—for example a self-signed cryptographic certificate of all of the other nodes that this node trusts.

The algorithm proceeds in periodic rounds. At every round:

A group of nodes, M, are randomly selected;

For each $(m_1, m_2)$ in M×M−{(m, m)|m∈M}:

1. $m_1$ and $m_2$ mutually attest each other, with their respective cryptographic certificates bound by their generated attestation tokens, if not already done,
2. $m_1$ and $m_2$ securely exchange their lists of previously attested nodes,
3. $m_1$ appends the list received from $m_2$ to its own list, also adding $m_2$'s identity,
4. $m_2$ appends the list received from $m_1$ to its own list, also adding $m_1$'s identity;

Eventually, a network in a steady state may reach a consensus on the list of attested nodes, with the identity of each node in the network being featured in each other node's list of attested nodes. One skilled in the art will appreciate that the advantages described in the present disclosure are also exhibited in examples in which a full consensus is not reached. This list of identities can be used to establish secure point-to-point communication with any other node.

Following the algorithm above, a node will only appear in another node's list of attested nodes if it has been attested by a node previously trusted (either after an explicit attestation step, or through transitive trust) by that node.

In the description above, it is stated that "$m_1$ and $m_2$ securely exchange their lists of previously attested nodes". Here, an integrity- (and potentially confidentially-) protected link may be established between the two nodes in order to prevent a man-in-the-middle maliciously inserting the identity of another, compromised node in the network during this exchange. There are various ways that this can be done, including via a TLS connection making use of cryptographic certificates that the two nodes exchange to ensure that the two are both communicating with the node that they think they are.

For a node to join the network, it makes itself available for selection in the periodic rounds described above. In some examples, in order to handle nodes joining the network, a round in the algorithm described above is not aborted if two nodes selected in the round are already mutually trusting: this is because one of the two nodes may have knowledge of a new node that has joined the network recently.

Figure 4:
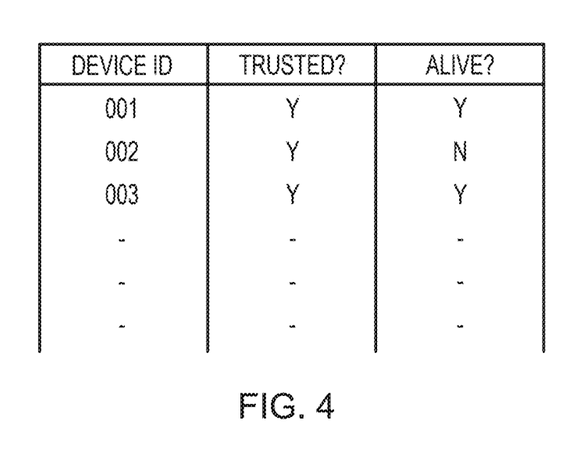
FIG. 4 depicts an example trusted device list.

FIG. 4 schematically depicts a trusted device list which may be maintained by the devices discussed above. The list comprises multiple device IDs, and a flag indicating whether they are trusted. This allows for a device to be specifically marked as non-trusted. Alternatively, there may be no such flag, and it may be implicit that the list includes only trusted devices.

The example list of FIG. 4 also includes further metadata: an aliveness indication for each device. Alternatively or additionally, other metadata may be included. This allows further metadata regarding the devices of a network (such as whether a device is currently alive) to be shared in the same manner as the above-described trust updates.

Figure 5:
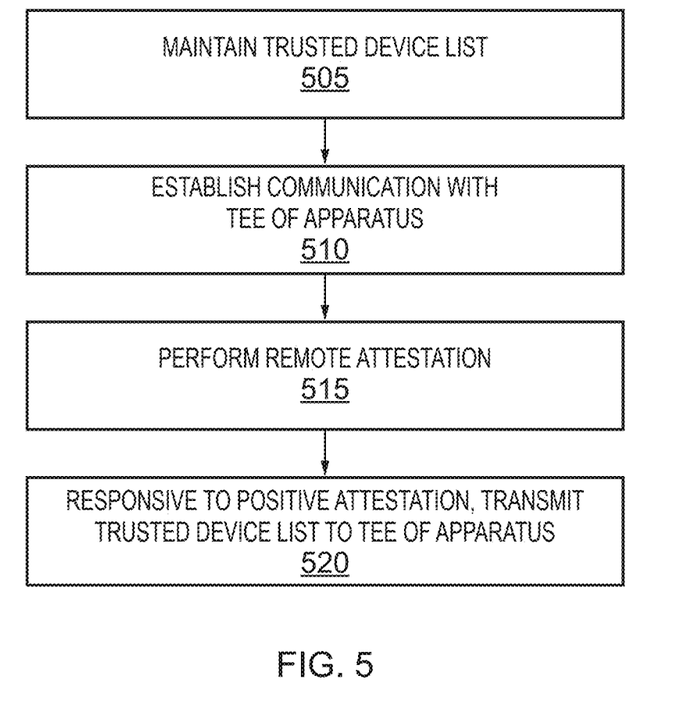
FIG. 5 depicts a method according to an example.

FIG. 5 schematically depicts a method according to an example. The method may for example be performed by the TEE one of the devices discussed above.

The TEE maintains (505) a trusted device list.

The TEE establishes communication (510) with the TEE of an apparatus (which may be another of the devices discussed above).

The TEE performs (515), with the TEE of the apparatus, a remote attestation in respect of its functionality.

Responsive to a positive outcome of the attestation, the TEE transmits (520) its trusted device list to the TEE of the apparatus.

Apparatuses and methods are thus provided for establishing mutual trust between devices in a network.

From the above description it will be seen that the techniques described herein provides a number of significant benefits. In particular, significant efficiency improvements are provided when compared with comparative devices in which network devices must each establish trust with each other device in a pairwise fashion.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

Examples of the present disclosure are set out in the following numbered clauses:

1. An apparatus comprising:
    trusted execution environment, TEE, circuitry, configured to maintain a list of trusted devices;
    interface circuitry to provide communication between the TEE circuitry of the apparatus and TEE circuitry of a device communicatively coupled to the apparatus;
    wherein the TEE circuitry of the apparatus is configured to:
        perform, with the TEE circuitry of the device, a remote attestation in respect of the TEE circuitry of the device;
        responsive to a positive outcome of the remote attestation, add the device to the list of trusted devices;
        receive, from the TEE circuitry of the device, an indication of one or more further devices which are trusted by the device; and
        add said one or more further devices to the list of trusted devices.

2. An apparatus according to clause 1, wherein the TEE circuitry is configured to perform, with the TEE circuitry of the device, a remote attestation in respect of the TEE circuitry of the apparatus.

3. An apparatus according to clause 2, wherein the TEE circuitry of the apparatus is responsive to a positive outcome of the remote attestation to transmit the list of trusted devices to the TEE circuitry of the device.

4. An apparatus according to any preceding clause, wherein the TEE circuitry of the apparatus is configured to:
    establish a connection, via the interface circuitry, with TEE circuitry of a further device;
    perform, with the TEE circuitry of the further device, a remote attestation process in respect of at least one of:
        the TEE circuitry of the further device; and
        the TEE circuitry of the apparatus, and
    responsive to a positive outcome of the remote attestation, transmit the list of trusted devices to the TEE circuitry of the further device.

5. An apparatus according to any preceding clause, wherein the list of trusted devices is initially empty.

6. An apparatus according to any preceding clause, wherein the TEE circuitry is configured:
    to receive, from TEE circuitry of one or more of the devices in the list of trusted devices, a further indication of one or more trusted devices; and
    to add said one or more trusted devices to the list of trusted devices.

7. An apparatus according to any preceding clause, wherein the TEE circuitry is configured to perform said remote attestation responsive to establishing communication with the device.

8. An apparatus according to any preceding clause, wherein the TEE circuitry is configured:
    to conduct confidential communications with devices in the list of trusted devices; and
    to not conduct said confidential communications with devices that are not in the list of trusted devices.

9. An apparatus according to any preceding clause, wherein the TEE circuitry is configured to perform the remote attestation by:
    transmitting an attestation request to the TEE circuitry of the device;
    receiving an attestation token from the TEE circuitry of the device;
    validating the attestation token; and
    responsive to a positive validation, determining a positive outcome of the remote attestation.

10. An apparatus according to clause 9, wherein the TEE circuitry is configured to validate the attestation token by:
    transmitting the validation token to a trusted third party; and
    receiving, from the trusted third party, a validation outcome report.

11. A method, performed by a device comprising TEE circuitry, comprising:
maintaining a list of trusted devices;
establishing communication with TEE circuitry of an apparatus;
performing, with the TEE circuitry of the apparatus, a remote attestation in respect of at least one of the TEE circuitry of the device and the TEE circuitry of the apparatus;
responsive to a positive outcome of the remote attestation, transmitting the list of trusted devices to the TEE circuitry of the apparatus.

12. A method according to clause 11, comprising transmitting the list of trusted devices using an epidemic protocol.

13. A method according to clause 12, comprising using the epidemic protocol to transmit further metadata to the TEE circuitry of the apparatus.

14. A method according to clause 13, wherein the further metadata comprises liveness information associated with one of the trusted devices in the list of trusted devices.

15. A method according to any of clauses 11 to 14, wherein for each trusted device in the list of trusted devices:
said trusted device previously performed a remote attestation process with the device; or
said trusted device was identified as a trusted device in an indication of trusted devices received, by the TEE circuitry of the device, from TEE circuitry of another trusted device.

16. A method according to any of clauses 11 to 15, comprising:
updating the list of trusted devices; and
transmitting the updated list of trusted devices to the TEE circuitry of the apparatus.

17. A method according to clause 16, wherein updating the list of trusted devices comprises at least one of:
identifying a device as a trusted device, and adding said device to the list of trusted devices; and
identifying a device, on the list of trusted devices, as no longer being trusted, and removing said device from the list of trusted devices.

18. A method according to any of clauses 11 to 17, comprising performing said remote attestation by transmitting an attestation token to the TEE of the apparatus, for validation thereby.

19. A method according to clause 18, wherein the attestation token comprises at least one of:
information corresponding to a firmware version of the TEE of the device;
information corresponding to hardware properties of the TEE of the device;
information corresponding to code to be executed by the TEE of the device;
a cryptographic key for communication between the TEE of the device and the TEE of the apparatus; and
a cryptographic hash of one or more of the above.

20. A system comprising the apparatus of any of clauses 1 to 10 and a device configured to perform the method of any of clauses 11 to 19.

We claim:

1. An apparatus comprising:
trusted execution environment, TEE, circuitry, configured to maintain a list of trusted devices;
interface circuitry to provide communication between the TEE circuitry of the apparatus and TEE circuitry of a device communicatively coupled to the apparatus;
wherein the TEE circuitry of the apparatus is configured to:
perform, with the TEE circuitry of the device, a remote attestation in respect of the TEE circuitry of the device;
responsive to a positive outcome of the remote attestation, add the device to the list of trusted devices;
receive, from the TEE circuitry of the device, when the device is configured to maintain a further list of trusted devices, an indication of one or more further devices on the further list of trusted devices; and
add said one or more further devices to the list of trusted devices.

2. An apparatus according to claim 1, wherein the TEE circuitry is configured to perform, with the TEE circuitry of the device, a remote attestation in respect of the TEE circuitry of the apparatus.

3. An apparatus according to claim 2, wherein the TEE circuitry of the apparatus is responsive to a positive outcome of the remote attestation to transmit the list of trusted devices to the TEE circuitry of the device.

4. An apparatus according to claim 1, wherein the TEE circuitry of the apparatus is configured to:
establish a connection, via the interface circuitry, with TEE circuitry of a further device;
perform, with the TEE circuitry of the further device, a remote attestation process in respect of at least one of:
the TEE circuitry of the further device; and
the TEE circuitry of the apparatus, and
responsive to a positive outcome of the remote attestation, transmit the list of trusted devices to the TEE circuitry of the further device.

5. An apparatus according to claim 1, wherein the list of trusted devices is initially empty.

6. An apparatus according to claim 1, wherein the TEE circuitry is configured:
to receive, from TEE circuitry of one or more of the devices in the list of trusted devices, a further indication of one or more trusted devices; and
to add said one or more trusted devices to the list of trusted devices.

7. An apparatus according to claim 1, wherein the TEE circuitry is configured to perform said remote attestation responsive to establishing communication with the device.

8. An apparatus according to claim 1, wherein the TEE circuitry is configured:
to conduct confidential communications with devices in the list of trusted devices; and
to not conduct said confidential communications with devices that are not in the list of trusted devices.

9. An apparatus according to claim 1, wherein the TEE circuitry is configured to perform the remote attestation by:
transmitting an attestation request to the TEE circuitry of the device;
receiving an attestation token from the TEE circuitry of the device;
validating the attestation token; and
responsive to a positive validation, determining a positive outcome of the remote attestation.

10. An apparatus according to claim 9, wherein the TEE circuitry is configured to validate the attestation token by:
transmitting the validation token to a trusted third party; and
receiving, from the trusted third party, a validation outcome report.

11. A method performed by a device comprising trusted execution environment, TEE, circuitry of the device, comprising:
- maintaining, by the TEE circuitry of the device, a list of trusted devices of the device;
- establishing communication with TEE circuitry of a further device;
- performing, with the TEE circuitry of the further device, a remote attestation with respect to the TEE circuitry of the further device;
- responsive to a positive outcome of the remote attestation, transmitting the list of trusted devices of the device to the TEE circuitry of the further device;
- receiving, from the TEE circuitry of the further device, when the further device is configured to maintain a list of trusted devices of the further device, an indication of one or more further devices on the list of trusted devices of the further device; and
- adding the one or more further devices to the list of trusted devices of the device.

12. A method according to claim 11, comprising transmitting the list of trusted devices using an epidemic protocol.

13. A method according to claim 12, comprising using the epidemic protocol to transmit further metadata to the TEE circuitry of the apparatus.

14. A method according to claim 13, wherein the further metadata comprises liveness information associated with one of the trusted devices in the list of trusted devices.

15. A method according claim 11, wherein for each trusted device in the list of trusted devices:
- said trusted device previously performed a remote attestation process with the device; or
- said trusted device was identified as a trusted device in an indication of trusted devices received, by the TEE circuitry of the device, from TEE circuitry of another trusted device.

16. A method according to claim 11, comprising:
- updating the list of trusted devices; and
- transmitting the updated list of trusted devices to the TEE circuitry of the apparatus.

17. A method according to claim 16, wherein updating the list of trusted devices comprises at least one of:
- identifying a device as a trusted device, and adding said device to the list of trusted devices; and
- identifying a device, on the list of trusted devices, as no longer being trusted, and removing said device from the list of trusted devices.

18. A method according to claim 11, comprising performing said remote attestation by transmitting an attestation token to the TEE of the apparatus, for validation thereby.

19. A method according to claim 18, wherein the attestation token comprises at least one of:
- information corresponding to a firmware version of the TEE of the device;
- information corresponding to hardware properties of the TEE of the device;
- information corresponding to code to be executed by the TEE of the device;
- a cryptographic key for communication between the TEE of the device and the TEE of the apparatus; and
- a cryptographic hash of one or more of the above.

20. A system comprising:
- an apparatus comprising:
  - trusted execution environment, TEE, circuitry of the apparatus, configured to maintain a list of trusted devices of the apparatus;
  - interface circuitry configured to provide communication between the TEE circuitry of the apparatus and TEE circuitry of a device communicatively coupled to the apparatus;
  - wherein the TEE circuitry of the apparatus is configured to:
    - perform, with the TEE circuitry of the device, a remote attestation with respect to the TEE circuitry of the device;
    - responsive to a positive outcome of the remote attestation, add the device to the list of trusted devices of the apparatus;
    - receive, from the TEE circuitry of the device, when the device is configured to maintain a list of trusted devices of the device, an indication of one or more further devices on the list of trusted devices of the device; and
    - add the one or more further devices to the list of trusted devices of the apparatus; and
- wherein the device is configured to perform a method, comprising:
- establishing communication with TEE circuitry of a further device;
- performing, with the TEE circuitry of the further device, a remote attestation with respect to the TEE circuitry of the further device;
- responsive to a positive outcome of the remote attestation, transmitting the list of trusted devices of the device to the TEE circuitry of the further device;
- receiving, from the TEE circuitry of the further device, when the further device is configured to maintain a list of trusted devices of the further device, an indication of one or more further devices on the list of trusted devices of the further device; and
- adding the one or more further devices to the list of trusted devices of the device.

* * * * *